United States Patent Office 2,816,897
Patented Dec. 17, 1957

2,816,897
ORGANIC CHEMICALS

Calvin N. Wolf, Baltimore, Md., assignor to Ethyl Corporation, New York, N. Y., a corporation of Delaware No Drawing. Application June 5, 1956
Serial No. 589,367

3 Claims. (Cl. 260—326)

This invention relates to novel compositions of matter and a process for their manufacture. In particular, this invention relates to novel nitrogen-containing tetrahydrophthalic derivatives.

It has long been known that hydrazine can be condensed with anhydrides of dicarboxylic acids to form products containing the equivalent of amide linkages. In general, this process has produced two distinct types of materials which have had limited application in the chemical arts. Phthalic anhydrides, upon reaction with hydrazine, provide a class of compounds described as cyclohydrazides; that is, the two nitrogens of hydrazine become incorporated in a six-membered ring fused to the aromatic portion of the phthalic structure. Similarly, unsaturated aliphatic anhydrides, such as maleic, citraconic, and the like, produce cyclohydrazides having a six-membered heterocyclic ring, a typical example of which is the material, maleic hydrazide. Still other anhydrides of dibasic acids, in particular the saturated aliphatic anhydrides, produce a variety of products, and under most conditions of reaction these are characterized as being polymeric in nature.

It is an object, therefore, of this invention to provide novel compositions of matter which can be produced by reacting hydrazine with tetrahydrophthalic anhydrides. A further object of this invention is to provide a new class of materials having wide utility in the chemical arts and which have not previously been available. A still further object is to provide a novel process. These and other objects of the present invention will become apparent from the discussion hereinafter.

The above and other objects of this invention are accomplished by providing new compositions of matter having the structure (I)

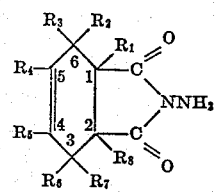

and (II)

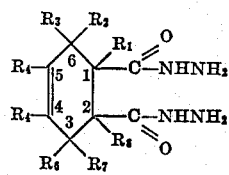

wherein $R_1$ to $R_8$ inclusive can be the same or different and are selected from the group consisting of hydrogen, and monovalent hydrocarbon radicals.

The compounds of this invention may also be referred to as N-amino-4-cyclohexene-1,2-dicarboximides and 4-cyclohexene-1,2-dicarboxyhydrazides. However, for purposes of conformity in the discussions hereinafter, they shall be referred to as the N-amino-1,2,3,6-tetrahydrophthalimides and 1,2,3,6-tetrahydrophthalic dihydrazides.

As described above, the groups $R_1$ to $R_8$ inclusive can be hydrogen or monovalent hydrocarbon radicals. The term monovalent hydrocarbon radical denotes a univalent aliphatic, alicyclic, or aromatic radical which can be further substituted. By the term univalent aliphatic radical is intended a univalent radical derived from an open chain saturated or unsaturated carbon compound. The term univalent alicyclic radical denotes a univalent radical derived from the corresponding aliphatic compounds by ring formation.

Thus, when the substituents of the compounds of this invention are univalent aliphatic radicals, they can be radicals such as the alkyl radicals, methyl, n-propyl, isopropyl, n-butyl, tertiary butyl, n-amyl, and various positional isomers such as, for example, 1-methylbutyl; 2-methylbutyl; 1,1-dimethylpropyl; 1,2-dimethylpropyl; and 1-ethylpropyl, and likewise, the corresponding straight or branched chain isomers of hexyl, heptyl, and the like up to and including about eicosyl. Moreover, such monovalent aliphatic radicals can be alkenyl radicals such as, for example, vinyl, $\Delta^1$-propenyl, $\Delta^2$-propenyl, $\Delta^1$-butenyl, $\Delta^3$-butenyl, and the corresponding branched chain isomers thereof, and other alkenyl radicals such as hexenyl, heptenyl, up to and including eicosenyl, and their corresponding branched chain isomers. Further, such monovalent hydrocarbon substituents can be aralkyl radicals such as, for example, benyl, $\alpha$-phenylethyl, $\beta$-phenylethyl, $\alpha$-phenylpropyl, $\gamma$-phenylpropyl, $\beta$-phenylisopropyl, $\alpha$-phenylbutyl, $\gamma$-phenylbutyl, $\delta$-phenylbutyl, and the like, and $\alpha'$-naphthylmethyl, $\beta'$-naphthylmethyl, $\alpha$-($\alpha'$-naphthyl)-ethyl, $\alpha$-($\beta'$-naphthyl)-ethyl, $\beta$-($\alpha'$-naphthyl)-ethyl, $\beta$-($\beta'$-naphthyl)-ethyl, and the like, and their corresponding positional isomers. Moreover, the univalent aliphatic radical or radicals can be aralkenyl radicals such as, for example, $\alpha$-phenyl vinyl, $\alpha$-phenyl-$\Delta^1$-propenyl; $\gamma$-phenyl-$\Delta^1$-propenyl, $\alpha$-phenyl-$\Delta^2$-propenyl, $\gamma$-phenyl-$\Delta^2$-propenyl, $\alpha$-phenylisopropenyl, -phenylisopropenyl, and similarly, the phenyl derivatives of the isomers of butenyl, pentenyl, hexenyl, and the like. Other such aryl alkenyls include $\alpha$-($\alpha'$-naphthyl)-ethenyl, $\alpha$-($\beta'$-naphthyl)-ethenyl, $\beta$-($\alpha'$-naphthyl)-ethenyl, $\beta$-($\beta'$-naphthyl)-vinyl, $\alpha$-($\alpha'$-naphthyl)-$\Delta^1$-propenyl, $\beta$-($\alpha'$-naphthyl)-$\Delta^1$-propenyl, $\alpha$-($\alpha'$-naphthyl)-$\Delta^2$-propenyl, $\alpha$-($\beta'$-naphthyl)-$\Delta^2$-propenyl, $\beta$-($\alpha'$-naphthyl)-$\Delta^2$-propenyl, $\alpha$-($\beta'$-naphthyl)-isopropenyl, $\beta$-($\alpha'$-naphthyl)-isopropenyl, $\beta$-($\beta'$-naphthyl)-isopropenyl, and the like.

When the monovalent hydrocarbon radical is a univalent alicyclic radical or radicals, these can be selected from the group consisting of cycloalkyl and cycloalkenyl radicals. Thus, for example, they can be the cycloalkyl radicals, cyclopropyl, cyclobutyl, cyclohexyl, cyclooctyl, cyclononyl, cyclodecyl, and the like, and such cycloaliphatic radicals as $\alpha$-cyclopropylethyl, $\beta$-cyclopropylethyl, $\alpha$-cyclobutylpropyl, $\gamma$-cyclobutylpropyl, and the like. Similarly, the alicyclic radicals can be cycloalkenyl radicals such as, for example, $\alpha$-cyclohexyl vinyl, $\beta$-cyclohexyl vinyl, $\alpha$-cycloheptyl-$\Delta^1$-propenyl, $\alpha$-cyclooctyl-$\Delta^2$-propenyl, $\beta$-cyclooctyl-$\Delta^2$-propenyl, $\beta$-cyclononyl isopropenyl, and the like. When the monovalent hydrocarbon radical is a univalent aromatic radical or radicals, these can be selected from the group consisting of aryl and alkaryl radicals; for example, aryl radicals such as phenyl, $\alpha$-naphthyl, $\beta$-naphthyl, $\alpha$-anthryl, $\beta$-anthryl, and the like. Moreover, the univalent aromatic radical can be alkaryl radicals, such as, for example, o-tolyl; p-tolyl; 2,3-xylyl; 2,4-xylyl; 2,6-xylyl; 3,5-xylyl; and the like, or o-ethylphenyl, p-ethylphenyl, 2-methyl-$\alpha$-naphthyl, 8-methyl-$\alpha$-naphthyl, and the like.

The preferred monovalent hydrocarbon radicals are those containing between about 1 to 10 carbon atoms, especially the alkyl radicals. In general, however, monovalent hydrocarbon radicals having up to about 20 carbon atoms are included. It is not intended that the groups $R_1$ to $R_8$ shall be restricted to the examples cited herein, as additional examples will be evident to those skilled in the art.

To the best of my knowledge, compounds having the structure I or II cannot be produced from the corresponding phthalic anhydride derivatives by the two steps of condensation with hydrazine and partial reduction to the tetrahydrophthalic structure. As previously noted, when phthalic anhydrides are reacted with hydrazine, the sole product is the corresponding phthalic cyclohydrazide.

In general, the novel products of this invention are prepared by the reaction of hydrazine with a tetrahydrophthalic anhydride having the general structure:

(III)

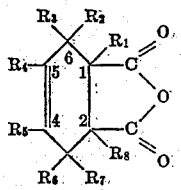

wherein the groups $R_1$ and $R_8$ have the meaning hereinbefore defined in the presence of an essentially inert organic solvent. The solvents are preferably selected from the group consisting of alcohols and non-polar organic solvents, namely, hydrocarbons and ethers.

Depending upon the solvent employed and the relative molar proportions of the hydrazine and the tetrahydrophthalic anhydride, surprisingly different and improved results are obtained. For example, one embodiment of the present invention comprises reacting a tetrahydrophthalic anhydride of Formula III with hydrazine in the presence of an alcohol. The proportions of the reactants in this embodiment are not critical and, in general, between about 1 and 3½ moles of hydrazine are employed when 2 moles of the tetrahydrophthalic anhydride is to be reacted. To obtain maximum yield, it is preferred to employ approximately 3 moles of hydrazine for each 2 moles of the tetrahydrophthalic anhydride. Upon conducting this embodiment of the present invention, both products I and II are found to be simultaneously present in the reaction products. These products can be separated by dilution in a suitable solvent and subsequently increasing concentration. As a preferred method, the novel products are separated by selective crystallization in hot benzene, although other solvents can be used depending upon the particular derivatives which are to be separated.

It has been surprisingly found that when tetrahydrophthalic anhydrides are reacted with hydrazine in the absence of alcohols as described above, which are polar solvents, but in the presence of non-polar solvents and by selective choice of the molar proportion of the reactants employed, substantially the sole reaction is formation of either the product I or II rather than a mixture of the two. Thus, another embodiment of the present invention consists of a process which comprises reacting a tetrahydrophthalic anhydride having the Formula III with hydrazine in the presence of a non-polar solvent, preferably selected from the group consisting of hydrocarbons and ethers.

In this embodiment of this invention, in order to produce the products having the structural formula I, the tetrahydrophthalic anhydride is reacted with between about 0.85 to 1.75 moles of hydrazine per mole of the anhydride. For economy and more efficient operation, it is preferred to employ substantially equal molar proportions of these reactants. If the proportions are varied substantially from this ratio, the yield of the desired product is somewhat reduced. In order to produce the product II by this embodiment of this invention, in general, at least about 2 moles of hydrazine per mole of tetrahydrophthalic anhydride is employed. For most efficient operation, it is preferable to employ between about 2 and 3 moles of hydrazine per mole of tetrahydrophthalic anhydride.

The aforementioned methods for the preparation of the compounds I or II are particularly preferred. Such are more practical and less costly since the precursor is the tetrahydrophthalic anhydride, is more readily available and easily prepared.

A still further embodiment of this invention is the production of the product II directly from the product I by reacting at least one mole of hydrazine with an N-amino-1,2,3,6-tetrahydrophthalimide in the presence of an organic solvent inert to the reactants, for example, the alcohols, hydrocarbons, and ethers set forth hereafter. In this mode of preparation of the dihydrazides, it is particularly preferred to employ between about 1 and 2 moles of hydrazine per mole of the tetrahydrophthalimide.

A still further alternate procedure for the preparation of the 1,2,3,6-tetrahydrophthalic dihydrazides which has been found comprises the formation of these compounds directly from the corresponding diacid, diester, diacid amides, diacid halides, and disalts having the structural formula depicted above as III in which such functions are substituted for the anhydride function depicted therein. In this embodiment, at least about 2 moles of hydrazine are employed per mole of 1,2,3,6-tetrahydrophthalic acid or acid derivative thereof. It is preferred to employ between about 2 and 3 moles of hydrazine per mole of the tetrahydrophthalic acid or acid derivative reactant. In this embodiment, we prefer to employ the lower alkyl esters such as, for example, the methyl, ethyl, propyl, butyl and the like esters having up to about 6 carbon atoms. The esters can be prepared by known methods by reacting the alcohol with the appropriate tetrahydrophthalic acid or acid halides. The diacid halides are readily prepared by known methods such as reacting a tetrahydrophthalic acid with phosphorus halide. The amides are prepared by reacting 1,2,3,6-tetrahydrophthalic acid esters and halides with ammonia. The acid salts are those which are prepared by reacting the tetrahydrophthalic acid with inorganic salts or bases particularly the hydroxides, carbonates, and bicarbonates of the alkali metals.

The substituted 1,2,3,6-tetrahydrophthalic anhydride employed in other embodiments of this invention or as the precursor to the esters, acid halides, amides and the like indicated above are in general prepared by the Diels-Alder condensation of the appropriate 1,3-butadiene or other conjugated diene with the appropriate maleic anhydride.

The novel products of this invention have wide utility in the chemical arts. For example, compounds of both structure I and II possess the unusual property of being effective in regulating the growth of living organisms and possess defoliant activity when applied to agricultural crops. Furthermore, materials of either the N-amino-1,2,3,6-tetrahydrophthalimide or 1,2,3,6-tetrahydrophthalic dihydrazide types, by virtue of the reactive amino groups, take place in condensation reactions with reactive molecules to provide, for example, polymers having unusual and distinct properties. Thus, when II is reacted with difunctional compounds, as dibasic acids, a linear long chain polymer can be produced. Such polymers are characterized by unusual stability, based presumably upon the fact that the tetrahydrophthalic dihydrazide structure itself possesses greater stability than corresponding dihydrazides of other dibasic acids. In addition, the products of this invention have particular utility as chemical intermediates. For example, they can be reacted to form other compounds which have utility as pesticides, insecticides, fungicides, and the like agricultural chemicals. Likewise, they will have utility in the preparation of medicinals and therapeutics. They can also be reacted to form compounds which may be used as feed supplements. Further, they can be used as dye intermediates. These and other uses will become apparent to those skilled in the art.

It is not intended to imply, however, that these two classes of compounds are equivalent and possess the above and other utility to the same degree. For example, when testing N-amino-1,2,3,6-tetrahydrophthalimide and 1,2,3,6-tetrahydrophthalic dihydrazide for their growth regulant properties on cucumber and wheat seedlings in the standard Petri-dish germination test, it is found that for both seedlings the N-amino-1,2,3,6-tetrahydrophthalimide is at least twice as effective as 1,2,3,6-tetrahydrophthalic dihydrazide. Similar such differences in characteristics of these two classes of compounds are exhibited in other utility described herein.

In some embodiments of this invention, the novel products can be produced by conducting the condensation reaction in the presence of an alcohol. Thus, for example, the tetrahydrophthalic anhydride can be condensed with hydrazine in the presence of the lower aliphatic alcohols such as methyl, propyl, the isomeric butyl alcohols, the isomeric amyl, hexyl, octyl, benzyl alcohols, β-phenethyl alcohol, and the like alcohols. In addition, the dihydric alcohols can be employed, and for some applications these are preferred in that higher temperatures can be employed without resorting to a pressure operation. Thus, for example, the dihydric alcohols which can be employed are ethylene glycol; propylene glycol; 1,3-dihydroxy butane; and the like up to and including the dihydric alcohols containing about 12 carbon atoms. Still other alcohols can be employed, but in general, due to greater availability, it is preferred to employ the mono- and polyhydric alcohols containing 1 to 12 carbon atoms.

In addition to the above defined aliphatic alcohols, certain derivatives of such alcohols can be employed in the process of this invention, in particular the partially etherified polyhydric alcohols. Thus, for example, excellent results are obtained when the tetrahydrophthalic anhydrides enumerated above are condensed with hydrazine in the presence of the monoethers of dihydric alcohols such as, for example, the monomethyl ether of ethylene glycol, ethylene glycol monoethyl ether, propylene glycol monoethyl ether, glycerol monoamyl ether, glycerol monoethyl ether, hexamethylene glycol monoethyl ether, diethylene glycol monomethyl ether, triethylene glycol monopropyl ether, dibutylene glycol monomethyl ether, propylene glycol monocyclobutyl ether, and the like.

In those embodiments of this invention wherein nonpolar solvents are employed, it is preferred to employ the hydrocarbons and ethers. Thus, the aliphatic and aromatic hydrocarbons can be employed. Among the aliphatic hydrocarbons which can be employed are the alkyl, cycloalkyl, alkenyl and cycloalkenyl hydrocarbons. Typical examples of such materials include the alkane hydrocarbons, particularly those having 5 and more carbon atoms such as the various isomeric pentanes, heptanes, nonanes, decanes, and the like up to and including those having about 18 carbon atoms. One criterion of choice is that the hydrocarbons are liquids at the reaction temperature. Lower boiling hydrocarbons can be employed but are not preferred since it is then necessary to employ pressure to provide a temperature sufficiently high to produce the condensation reaction at a reasonable rate. Similarly, the cycloalkanes can be employed such as, for example, cyclobutane, cyclopentane, cyclohexane, decalin and various hydrocarbon derivatives thereof such as the methyl cyclohexanes, the ethyl cyclohexanes and the like. In like fashion, one can employ olefins to provide the necessary inert reaction medium for the process. Among such materials are included the amylenes, the hexenes, the various heptenes and the like alkenes having up to about 18 carbon atoms. Such olefins are not restricted to the mono olefins but can include the polyolefins such as, for example, substituted butadienes and the like.

Typical examples of preferred embodiments of aromatic hydrocarbon solvents include benzene, toluene, the xylenes, ethyl benzene, the methyl naphthalenes, tetrahydronaphthalene, dihydronaphthalene, and the like. In general, it is preferred to employ aromatic hydrocarbons which are liquids at least at the reaction temperature to facilitate the preparation of the reaction mixture prior to conducting the condensation reaction.

It is not necessary to employ pure hydrocarbons as above for one can obtain good results by conducting the condensation in the presence of mixtures of hydrocarbons such as, for example, kerosene, naphthas, gasolines, including straight-run, reformed, catalytically cracked and aviation gasolines, heavy alkylate, Stoddard solvent, diesel oils and similar mixtures of hydrocarbons.

In addition to the hydrocarbon solvents, the ethers form a particularly suitable reaction medium. The criterion of choice of ethers is not critical provided there are no other functional groups on the ether which are capable of reacting with the hydrazine or the tetrahydrophthalic anhydride. A secondary consideration in choice is the physical characteristic of the ether and it is preferred that it be liquid at room temperature and have a sufficiently high boiling point that the reaction can be conducted at atmospheric pressure at the chosen reaction temperature. Thus, among the ethers which can be employed are included the mono ethers such as, for example, dibutyl ether, butyl ethyl ether, allyl isoamyl ether, allyl ether, amyl methyl ether, amyl ether, isoamyl ether, isobutyl ether, ethyl isoamyl ether, ethyl octyl ether, amyl phenyl ether, benzyl ethyl ether, benzyl methyl ether, butyl phenyl ether, butyl o-tolyl ether, butyl p-tolyl ether, ethyl phenyl ether, ethyl o-tolyl ether, isobutyl phenyl ether, isopropyl phenyl ether, methyl phenyl ether, methyl o-tolyl ether, methyl m-tolyl ether, methyl p-tolyl ether, and the like. Furthermore, the poly ethers can be employed. Included among such ethers are the dimethyl ether of ethylene glycol, the diethyl ether of ethylene glycol, ethylene glycol methyl ethyl ether, and the like, and the poly ethers such as diethyl Carbitol, dibutyl Carbitol, dimethoxy tetraglycol, dibutoxy tetraglycol, and the like.

To demonstrate the products and that embodiment of this invention wherein the products I and II are coproduced, the following examples are presented. In all examples herein, all parts are by weight.

*Example I*

The apparatus used consisted of a heating element, a reactor equipped with a reflux condenser and water separator and a means for agitation of the reaction mixture. Fifty-seven parts of 1,2,3,6-tetrahydrophthalic anhyride in 283.4 parts of n-butanol was placed in the reactor, to which, while being agitated, was added 28 parts of 85 percent hydrazine over a period of 15 minutes. Thus, 0.375 mole of hydrazine was added to 0.375 mole of tetrahydrophthalic anhydride. Agitation of the above mixture was continued for 30 minutes at the reaction temperature. The reaction mixture was then heated to reflux temperature and refluxed for 5 hours. After 2 hours of this refluxing, crystals began to separate. The crude product was then filtered, washed with 39.5 parts of ethanol, and dried. Forty-six parts of this dried product was obtained melting between 100–205° C. The crude product was then mixed in 439.5 parts of benzene at a temperature of about 80° C. This mixture was stirred for 10 minutes and filtered while hot to separate the white crystals. These crystals were dried at room temperature, and 17.3 parts were obtained having a melting point of 209–211° C. This product was identified as 1,2,3,6-tetrahydrophthalic dihydrazide. Analysis: C, 47.7%; H, 7.28%, N, 27.8%.

Calculated for $C_8H_{14}N_4O_2$: C, 48.4%; H, 7.12%; N, 28.2%.

The benzene mother liquor remaining from the above separation was then evaporated to a volume of about 50 parts. In this manner white crystals were formed. These crystals were filtered from the solution and dried. Twenty-two parts of product were obtained melting at 101–102° C. This product was identified as N-amino-1,2,3,6,-tetrahydrophthalimide. Analysis: C, 57.8%, H, 6.22%; N, 16.9%. Calculated for $C_8H_{10}N_2O_2$: C, 57.8%, H, 6.06%; N, 16.9%.

*Example II*

When 3-methyl-1,2,3,6-tetrahydrophthalic anhydride is reacted with hydrazine essentially as described in Example I, 3-methyl-1,2,3,6-tetrahydrophthalic dihydrazide and 3-methyl-N-amino-1,2,3,6-tetrahydrophthalimide are co-produced in similar amounts.

Similarly, when other substituted 1,2,3,6-tetrahydrophthalic anhydrides are reacted with hydrazine in the presence of alcohols, the corresponding N-amino 1,2,3,6-tetrahydrophalimide and 1,2,3,6-tetrahydrophthalic dihydrazide are produced. Thus, by reacting 3-ethyl-1,2,3,6-tetrahydrophthalic anhydride with hydrazine according to this embodiment of this invention, 3-ethyl-1,2,3,6-tetrahydrophthalic dihydrazide and 3-ethyl-N-amino-1,2,3,6-tetrahydrophthalimide are produced. Likewise, 3-phenyl-1,2,3,6-tetrahydrophthalic dihydrazide and 3-phenyl-N-amino-1,2,3,6-tetrahydrophthalimide can be produced by reacting 3-phenyl-1,2,3,6-tetrahydrophthalic anhydride with hydrazine in the presence of propyl alcohol. Further, by reacting 3,4-diphenyl-6-methyl-1,2,3,6-tetrahydrophthalic anhydride with hydrazine in the presence of benzyl alcohol, 3,4-diphenyl-6-methyl-N-amino-1,2,3,6-tetrahydrophthalimide and 3,4-diphenyl-6-methyl-1,2,3,6-tetrahydrophthalic dihydrazide are produced. Similarly, by reacting 3,4-dimethyl-1,2,3,6-tetrahydrophthalic anhydride in the presence of -phenethyl alcohol with hydrazine, 3,4-dimethyl-1,2,3,6-tetrahydrophthalic dihydrazide and 3,4-dimethyl-N-amino-1,2,3,6-tetrahydrophthalimide are produced. Likewise, 3-methyl-3-ethyl-6-isopropyl-N-amino-1,2,3,6-tetrahydrophthalimide and 3-methyl-3-ethyl-6-isopropyl-1,2,3,6-tetrahydrophthalic dihydrazide can be produced when reacting hydrazine with 3-methyl-3-ethyl-6-isopropyl-1,2,3,6-tetrahydrophthalic anhydride using ethylene glycol monoethyl ether as a solvent. Moreover, when reacting 4-cyclopropyl tetrahydrophthalic anhydride with hydrazine in the presence of isoamyl alcohol, 4-cycloproply-1,2,3,6-tetrahydrophthalic diphyrazide and 4-cyclopropyl-N-amino - 1,2,3,6 - tetrahydrophthalimide are produced. In addition, 3-(2-phenyl ethyl)-N-amino-1,2,3,6-tetrahydrophthalimide and 3-(2-phenyl ethyl)-1,2,3,6-tetrahydrophthalic dihydrazide can be produced by reacting hydrazine with 3 - (2 - phenyl ethyl) - 1,2,3,6-tetrahydrophthalic anhydride using glycerol monoethyl ether as a solvent. In addition to the above, 3-methyl-3-p-tolyl-N-amino-1,2,3,6-tetrahydrophthalimide and 3-methyl-3-p-tolyl-1,2,3,6-tetrahydrophthalic dihydrazide can be produced by reacting 3-methyl-3-p-tolyl-1,2,3,6-tetrahydrophthalic anhydride with hydrazine in the presence of glycerol monoamyl ether according to the process of this invention. Likewise, 3-vinyl-N-amino-1,2,3,6-tetrahydrophthalimide and 3-vinyl-1,2,3,6-tetrahydrophthalic dihydrazide can be produced by reacting 3-vinyl-1,2,3,6-tetrahydrophthalic anhydride with hydrazine utilizing methyl alcohol as a solvent. Moreover, 5-methyl-3-isopropenyl-1,2,3,6-tetrahydrophthalic dihydrazide can be produced when reacting 5-methyl-3-isopropenyl-1,2,3,6-tetrahydrophthalic anhydride in the presence of ethyl alcohol.

The following examples demonstrate the preparation of the N-amino-1,2,3,6-tetrahydrophthalimides directly by employing nonpolar solvents and essentially equimolar proportion of the anhydride and hydrazine.

*Example III*

To a mixture of 76 parts (0.5 mole) of 1,2,3,6-tetrahydrophthalic anhydride and about 318 parts of benzene was added 16.9 parts (0.5 mole) of 95 percent hydrazine which was rinsed in with 44 parts of additional benzene. The mixture was continued in a reactor equipped with a water trap and a reflux condenser. The mixture was then heated to the reflux temperature and refluxed for 2½ hours by which time about 9½ parts of water was collected and considerable white solid was formed in the flask. The mixture was then allowed to cool and the product separated by filtration. Drying of the product yielded 63 parts (76% yield) of N-amino-1,2,3,6-tetrahydrophthalimide. Recrystallization from benzene produced 49 parts melting at 97–99° C.

*Example IV*

To a reactor equipped with a reflux condenser and agitator was added 152 parts of 1,2,3,6-tetrahydrophthalic anhydride and about 879 parts of benzene. To this mixture was added 33.8 parts of hydrazine while being agitated over a period of 10 minutes. The agitated reaction mixture was then heated to the reflux temperature and refluxed for a period of 1 hour and 40 minutes. At the end of this period a Dean-Stark tube was inserted between the reactor and reflux condenser. Stirring and refluxing was then continued for an additional 1 hour and 5 minutes, at which time 17 parts of $H_2O$ was collected in the Dean-Stark tube. The reaction mixture was then allowed to stand at room temperature overnight. Upon shaking, crystals separated which were filtered and dried. The yield of N-amino-1,2,3,6-tetrahydrophthalimide was 156.5 parts, melting at 99–101° C. Upon recrystallization from water, the yield was 94.0 parts.

When substituted 1,2,3,6-tetrahydrophthalic anhydrides are reacted with hydrazine in the presence of inert nonpolar organic solvents according to the above embodiment by appropriate substitution in the above examples, equally satisfactory results are obtained. Thus, for example, employing the procedure of Example III, 3-ethyl-1,2,3,6-tetrahydrophthalic anhydride reacted with hydrazine in the presence of heptane produces 3-ethyl-N-amino-1,2,3,6-tetrahydrophthalimide. Additionally, when 3-phenyl - 1,2,3,6 - tetrahydrophthalic anhydride is reacted with hydrazine in the presence of nonane, the corresponding N - amino - tetrahydrophthalimide is formed. These and other examples of the reactants and other corresponding products produced will be evident to those skilled in the art. Likewise, the various ethers mentioned hereinbefore can also be used as solvents in the place of the hydrocarbons in the above cited examples.

The following examples will demonstrate that embodiment of the present invention wherein the dihydrazides are produced directly when employing the non-polar solvents and particular molar proportions of the hydrazine.

*Example V*

To a mixture of 76 parts (0.5 mole) of 1,2,3,6-tetrahydrophthalic anhydride and 318 parts of benzene was added 34 parts (1.0 mole) of 95 percent hydrazine which was contained in a reactor fitted with a water trap and a reflux condenser. The mixture was heated to the reflux temperature and refluxed for 2½ hours by which time about 9½ parts of water was collected in the trap and considerable white solid was formed. The reaction mixture was cooled to room temperature and the solid filtered. Seventy-eight parts of crude product remained on drying, yield 79 percent, melting at 218 to 220° C. Seventy-three parts of the crude product were recrystallized from 200 parts of water to yield 16 parts of product. The mother liquor from this recrystallization was evaporated and the residue recrystallized from aqueous alcohol to yield an additional 48 parts of product, M. P. 221–223° C. Thus, the total yield of recrystallized product was 64.5 percent.

Example VI

A run was made essentially the same as above with the exception that a steam bath was used as a heating element, for the purpose of eliminating local over-heating. In this run, the yield was 94 parts of 1,2,3,6-tetrahydrophthalic dihydrazide, melting at 218–219° C. Thus, it was found that by using a steam bath as a heating element the yield was increased to 95 percent by virtue of eliminating local over-heating and by the use of a longer reflux time, namely, 12 hours.

Example VII

The apparatus used in this run consisted of a reactor equipped with an agitator, a reflux condenser, a water trap, and a means for heating the reaction mixture. Approximately 450 parts of benzene was placed in the reactor and heated to a temperature of about 80° C. Seventy-six parts of 1,2,3,6-tetrahydrophthalic anhydride was dissolved in this hot benzene and the heating was stopped. Thirty-four parts of hydrazine was then added to the above mixture over a period of about ½ hour during which time the reaction mixture was agitated. It was noted that heat was evolved and that a large amount of solid was formed. When the reaction heat subsided the reaction mixture was then heated to the reflux temperature and refluxed for 6 hours while being agitated. During the first 5 hours of the reflux period, the liquid trapped in the water trap was returned periodically to the reaction mixture. During the last hour of the reflux period the liquid retained in the water trap amounted to about 10 parts consisting substantially of water and this was not returned to the reaction mixture. The mixture was then allowed to cool to room temperature, filtered and the crude product obtained was dried. The yield of crude product was 95 parts or 92 percent, melting between 216–219° C. This crude product was then suspended in about 450 parts of benzene at a temperature of about 80° C. The solid was then filtered and dried to yield 88 parts (yield 89%) of 1,2,3,6-tetrahydrophthalic dihydrazide.

When the tetrahydrophthalic anhydrides described above are substituted in the above and other examples of this embodiment of this invention, the corresponding 1,2,3,6-tetrahydrophthalic dihydrazide is produced in similar high yield. Additionally, the liquid hydrocarbons and ethers such as heptane, cyclohexane, toluene, dibutyl ether, diethyl ether, and the like can be employed in place of benzene in the above examples.

The following examples will demonstrate the preparation of the dihydrazides from the tetrahydrophthalimides according to that embodiment of this invention in the presence of an essentially inert organic solvent, for example, the alcohols, hydrocarbons or ethers.

Example VIII

To a mixture of 8.3 parts (0.05 mole) of N-amino-1,2,3,6-tetrahydrophthalimide was added 3.8 parts (0.11 mole) of 95 percent hydrazine and about 37 parts of n-butyl alcohol. The reaction mixture was then heated to reflux temperature and refluxed for 2½ hours at the end of which time the contents of the flask was almost completely solid. Benzene was used to aid in removinng the solid from the flask. Upon filtration of the benzene solution and drying, 8.7 parts of product was obtained, melting at 223–225° C. Thus, the yield was 88 percent. Upon mixture with an authentic sample of 1,2,3,6-tetrahydrophthalic dihydrazide, no depression in the melting point was observed.

Similarly, when substituted N-amino-1,2,3,6-tetrahydrophthalimides are employed in the above and other examples according to this embodiment of this invention, the corresponding 1,2,3,6-tetrahydrophthalic dihydrazides are produced, for example, when reacting 3-ethyl-N-amino-1,2,3,6-tetrahydrophthalimide with hydrazine in the presence of heptane 3-ethyl-1,2,3,6-tetrahydrophthalic dihydrazide is produced in corresponding yield. Additionally, when 3,4-dimethyl-N-amino-1,2,3,6-tetrahydrophthalimide is reacted with hydrazine, the corresponding 1,2,3,6 - tetrahydrophthalic dihydrazide is produced. Likewise, the various ethers or alcohols mentioned hereinbefore can be substituted for the hydrocarbons and alcohol present in the foregoing example to produce satisfactory results. These and other examples of this embodiment of the present invention will be apparent to those skilled in the art.

The following example demonstrates that embodiment of this invention wherein the dihydrazide is produced directly from the tetrahydrophthalic acid or ester, salt and the like derivatives thereof.

Example IX

To a reactor equipped with an agitator, a heating element, and reflux condenser was added 22.6 parts of the diethyl ester of 1,2,3,6-tetrahydrophthalic acid and 6.8 parts of 95 percent hydrazine. Thus, $\frac{1}{10}$ mole of the diethyl ester was reacted with $\frac{2}{10}$ mole of hydrazine. The reaction mixture was then heated and maintained for a period of one hour at temperatures of between 70 and 80° C. while being agitated. At the end of this time, the reaction mixture was heated to the reflux temperature and maintained at this temperature for about two hours, during which time a considerable amount of crystallization formed, and the reaction mixture solidified. The product was then allowed to cool at room temperature and was recrystallized from about 100 parts of ethyl alcohol. The product from this recrystallization was 8.0 parts, melting at 223 to 225° C. Upon admixture with an authentic sample of 1,2,3,6-tetrahydrophthalic dihydrazide no depression in the melting point was found.

When 1,2,3,6-tetrahydrophthalic dicarboxylic acid, the diacid halides, diamides or disodium salts of this acid are substituted for the diethyl ester or other esters in the above example in the presence of the solvents described hereinbefore, equally good results are obtained.

Inherent in compounds similar to the 1,2,3,6-tetrahydrophthalic dihydrazides is their theoretical capability of existing in different structural arrangements. This property is commonly referred to as cis-trans or geometrical isomerism. Likewise, the 1,2,3,6-tetrahydrophthalic dihydrazides of this invention may exist in either the cis or trans configuration.

The temperature employed in all embodiments of conducting the novel condensation reaction of this invention is not critical, although for ease of operation it is preferred to employ relatively elevated temperatures in the range of between about 40 and 200° C. In the presence of solvents of medium boiling range; that is, 60 to 150° C., the process of this invention can be conducted at the reflux temperature under atmospheric pressure of the reaction mixture. With the lower boiling solvents this process can likewise be operated at the normal reflux temperature, although the reaction time can be decreased by employing higher temperatures and a pressurized system. With the higher boiling solvents it is possible to conduct the reaction without reflux by heating the mixture in an open vessel and providing agitation to facilitate the reaction process.

A by-product of certain embodiments of the condensation reactions of this invention is water, and this can either be returned to the reaction as reflux or it can be removed by distillation to a separator, particularly when higher solvents are employed in which water has a limited solubility, and the solvent after separation can thereupon be returned to the reaction system. Thus, when practical, an azeotropic distillation of the water formed can be employed, which in some instances enhances the reaction rate.

Likewise, with the hydrazine ordinarily available as an article of commerce, water is introduced into the reaction mixture. It has been found that normally this water so introduced has no effect upon the reaction, and, in fact, when the reaction mixture contains alcohols having limited solubility for water, this water initially introduced is quickly dispelled if the reaction is run at the boiling point, and the vapors pass through a condenser and water separator. Conversely, anhydrous hydrazine can be employed.

The reaction time required to produce the products of this invention in satisfactory yield will depend upon several factors; namely, the reactivity of the tetrahydrophthalic anhydride employed and the temperature of the reaction mixture. In general, it has been found that in those embodiments wherein water is coproduced, it is possible to determine readily the extent of reaction and ultimately the time at which the reaction is substantially complete. In general, in all methods of preparation a reaction time between about 1 and 10 hours is satisfactory.

Another characteristic of the compounds of the present invention is their property of enhancing hydrocarbon compositions. That is to say, an additional feature of the N-amino-1,2,3,6-tetrahydrophthalimides and 1,2,3,6-tetrahydrophthalic dihydrazides is that they can be used as fuel and lubricant oil additives and in particular as antioxidants, stabilizers and the like. By way of example, when extremely small quantities of the compounds of this invention are blended with hydrocarbon compositions the resulting improved material is no longer susceptible to deterioration in the presence of oxygen or ozone. For illustrative purposes, when N-amino-1,2,3,6-tetrahydrophthalimide or suitable substituted derivatives thereof are added to commercial gasolines containing a substantial proportion of unsaturates and the resulting blend is initimately mixed by means of stirring, shaking or other methods of mechanical agitation, the resulting hydrocarbon compositions possess greater resistance to atmospheric oxidation than the untreated material. To clearly demonstrate the effectiveness of the materials of the present invention in this regard, recourse can be made to the standard method of the American Society of Testing Materials by determination of the Oxidation Stability of Gasoline (Induction Period Method), ASTM designation: D525-46, as fully described in Part III-A, ASTM Standards for 1946. In like maner, such materials as 1,2,3,6-tetrahydrophthalic dihydrazide can be utilized in minor proportions in such hydrocarbon compositions as lubricating oils, bunker oils and catalytically cracked stocks such as fuel for compression ignition engines and the like. By so doing, the property inherent in the materials of the present invention of protecting such materials against oxidative deterioration becomes readily apparent. Another class of hydrocarbon compositions which can be protected against atmospheric deterioration is elastomeric material.

For example, the incorporation of minor proportions of N-amino-1,2,3,6-tetrahydrophthalimides or 1,2,3,6-tetrahydrophthalic dihydrazides of the present invention in natural rubber, elastothiomers, elastolenes, elastoplastics, and elastoprenes results in substantial resistance to the adverse effects of oxygen and ozone which can be demonstrated by ASTM Test Procedure, D572-42, described in the ASTM Standards for 1946, Part III-B, commonly known as the accelerated aging procedure. Likewise, many of the compounds of this invention are admirably suited for use in organolead containing compositions particularly antiknock fluids, in this capacity acting primarily as organometallic stabilizers, although additional benefits are to be derived upon blending such fluids with hydrocarbon fuel.

Having thus described the novel products of this invention and the novel process for their manufacture, it is not intended that this invention be limited except as noted in the appended claims. This application is a continuation in part of Serial No. 358,181, filed May 28, 1951, now abandoned.

I claim:

1. A process for the manufacture of N-amino-1,2,3,6-tetrahydrophthalimide which comprises reacting 1,2,3,6-tetrahydrophthalic anhydride with hydrazine in essentially equimolar amounts in the presence of n-butanol at the reflux temperature of the reaction mixture and recovering said N-amino-1,2,3,6-tetrahydrophthalimide.

2. As a new composition of matter N-amino-1,2,3,6-tetrahydrophthalimide.

3. A process for the manufacture of N-amino-1,2,3,6-tetrahydrophthalimide which comprises reacting 1,2,3,6-tetrahydrophthalic anhydride with hydrazine in essentially equimolar amounts in the presence of a lower aliphatic alcohol containing 1 to 12 carbon atoms selected from the group consisting of monohydric alcohols, polyhydric alcohols, and partially etherified polyhydric alcohols at the reflux temperature of the reaction mixture and recovering said N-amino-1,2,3,6-tetrahydrophthalimide.

References Cited in the file of this patent
UNITED STATES PATENTS 2,615,862    McFarlane et al.   ---------- Oct. 28, 1952

OTHER REFERENCES

Drew et al.: "J. Chem. Soc.," pages 16 to 26 (London), 1937.

Offe et al.: "Z. Naturfarsch," vol. 7-b (1952), page 449.